(12) United States Patent
Tomoda et al.

(10) Patent No.: US 6,363,909 B1
(45) Date of Patent: Apr. 2, 2002

(54) DIRECT-FUEL-INJECTION-TYPE SPARK-IGNITION INTERNAL COMBUSTION ENGINE AND METHOD OF FUEL INJECTION

(75) Inventors: Terutoshi Tomoda, Mishima; Mutsumi Kanda, Susono; Takashi Usui, Toyota; Toshimi Kashiwagura, Susono, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/634,877

(22) Filed: Aug. 7, 2000

(30) Foreign Application Priority Data

Aug. 23, 1999 (JP) .......................................... 11-235958

(51) Int. Cl.⁷ .............................................. F02B 17/00
(52) U.S. Cl. ....................................... 123/295; 123/305
(58) Field of Search ................................ 123/295, 305, 123/298, 276

(56) References Cited

U.S. PATENT DOCUMENTS 3,572,298 A * 3/1971 Onish et al. ................. 123/301
4,040,393 A * 8/1977 Decker et al. ............... 123/276
4,232,638 A   11/1980 Takashashi et al.
4,799,465 A * 1/1989 Yanagisawa et al. ....... 123/276
5,042,442 A * 8/1991 Laskaris et al. ............. 123/305
5,605,125 A   2/1997 Yaoita

FOREIGN PATENT DOCUMENTS

DE    DE 31 48 165 A1    10/1982
JP    A-60-261922        12/1985
JP    JP 08177497         7/1996

* cited by examiner

Primary Examiner—John Kwon
(74) Attorney, Agent, or Firm—Oliff & Berridge, PLC (57) ABSTRACT

A direct-fuel-injection-type spark-ignition internal combustion engine has an ignition plug, a cavity formed in an upper wall of a cylinder, a fuel injection valve that injects fuel so that most of the fuel strikes a side wall of the cavity at an acute angle with respect to a tangent to the side wall at the point where the fuel strikes it, and a fuel guide portion that is provided in the side wall of the cavity and that guides most of the fuel to the vicinity of the ignition plug. The direct-fuel-injection-type spark-ignition internal combustion engine is able to realize a good stratified charge combustion by reliably positioning a major portion of combustible mixture in the vicinity of the ignition plug at the time of ignition.

22 Claims, 5 Drawing Sheets

DIRECT-FUEL-INJECTION-TYPE SPARK-IGNITION INTERNAL COMBUSTION ENGINE AND METHOD OF FUEL INJECTION

BACKGROUND OF THE INVENTION

INCORPORATION BY REFERENCE

The disclosure of Japanese Patent Application No. 11-235958 filed on Aug. 23, 1999 including the specification, drawings and abstract is incorporated herein by reference in its entirety.

1. Field of Invention

The invention relates to a direct-fuel-injection-type spark-ignition internal combustion engine having, in an upper wall of a cylinder, a cavity for forming a combustible air-fuel mixture, and to a method of injecting fuel with such an engine.

2. Description of Related Art

Typically, a direct-fuel-injection-type spark-ignition internal combustion engine having a fuel injection valve for injecting fuel directly into a cylinder injects fuel into a cavity formed in a top surface of a piston during a late period of the compression stroke so as to vaporize fuel using heat from the piston and to guide the vaporized fuel to the vicinity of an ignition plug so that, at the time of ignition, a combustible air-fuel mixture with a good ignition quality is formed only in the vicinity of the ignition plug. The engine thus realizes stratified charge combustion that allows combustion of a mixture that is fuel-lean in terms of the entire cylinder.

In this kind of direct-fuel-injection-type spark-ignition internal combustion engine, the fuel injection timing is limited by the piston position in order to reliably inject fuel into the cavity, so that the freedom in fuel injection is low. Therefore, when the piston rising speed during the compression stroke becomes high as the engine revolution speed increases, the time between the lowermost piston position where fuel injection is allowed and the ignition timing becomes particularly short so that it becomes difficult to form a good combustible mixture. To solve this problem, Japanese Patent Application Laid-Open No. 60-261922 proposes increasing the freedom in fuel injection by forming a cavity in the cylinder head.

However, even if a cavity is formed in the cylinder head and fuel is simply injected into the cavity as described above, it is not always the case that the entire amount of fuel injected has vaporized and formed a combustible mixture at the time of ignition. Furthermore, even if a combustible mixture is formed, there is a possibility that the combustible mixture is not positioned in the vicinity of the ignition plug at the time of ignition; for example, a main portion of the mixture may flow out of the cavity before the ignition.

SUMMARY OF THE INVENTION

Accordingly, a direct-fuel-injection-type spark-ignition internal combustion engine according to the invention provides a good stratified charge combustion by reliably positioning a main portion of an air-fuel mixture near an ignition plug at the time of ignition in a direct-fuel-injection-type spark-ignition internal combustion engine having, in an upper cylinder wall, a cavity for forming a combustible mixture.

To provide a good stratified charge combustion, a direct-fuel-injection-type spark-ignition internal combustion engine according to one aspect of the invention includes an ignition plug, a cavity formed in an upper wall of a cylinder, and a fuel injection valve that injects fuel so that most of the fuel strikes a side wall of the cavity at an acute angle with respect to a tangent to the side wall at the point where the fuel strikes the side wall. The side wall of the cavity has a fuel guide portion. Most of the fuel is guided along the fuel guide portion to the vicinity of the ignition plug.

In the various exemplary embodiments of the invention, most of the fuel forms a narrow and long body of combustible mixture due to heat received as it moves along the fuel guide portion. Since the narrow and long body of combustible mixture passes by the ignition plug, the combustible mixture remains in contact with the ignition plug for a relatively long time. Therefore, it becomes possible to relatively freely set the fuel injection timing and the ignition timing. Hence, the direct-fuel-injection-type spark-ignition internal combustion engine of the invention is able to reliably position a main portion of combustible mixture in the vicinity of the ignition plug at the time of ignition and therefore realize a good stratified charge combustion.

In the direct-fuel-injection-type spark-ignition internal combustion engine, the fuel injection valve may inject the main portion of the fuel separately in two directions. In this case, portions of the main portion of the fuel injected in the two directions are guided along the fuel guide portion to the vicinity of the ignition plug so as to face each other.

Furthermore, in the direct-fuel-injection-type spark-ignition internal combustion engine, at least a portion of the fuel guide portion may be adjacent to an intake port opening formed in the upper wall of the cylinder.

Still further, in the direct-fuel-injection-type spark-ignition internal combustion engine, at least a portion of the fuel guide portion may be adjacent to an exhaust port opening formed in the upper wall of the cylinder.

Still further, in the direct-fuel-injection-type spark-ignition internal combustion engine, the fuel guide portion may have a barrier portion that a liquid fuel moving along the fuel guide portion strikes in the vicinity of the ignition plug.

Further, in the direct-fuel-injection-type spark-ignition internal combustion engine, the fuel injection valve may inject the fuel as a generally flat sector-shaped (i.e. fan-shaped) fuel spray having a small thickness. In this case, a central portion of the sector-shaped fuel spray in a direction of a width of the sector-shaped fuel spray is directed substantially toward a center axis of the ignition plug.

BRIEF DESCRIPTION OF THE DRAWINGS

The foregoing and further aspects, features and advantages of the invention will become apparent from the following description of exemplary embodiments with reference to the accompanying drawings, wherein like numerals are used to represent like elements and wherein.

DETAILED DESCRIPTION OF PREFERRED EMBODIMENTS

Figure 1:
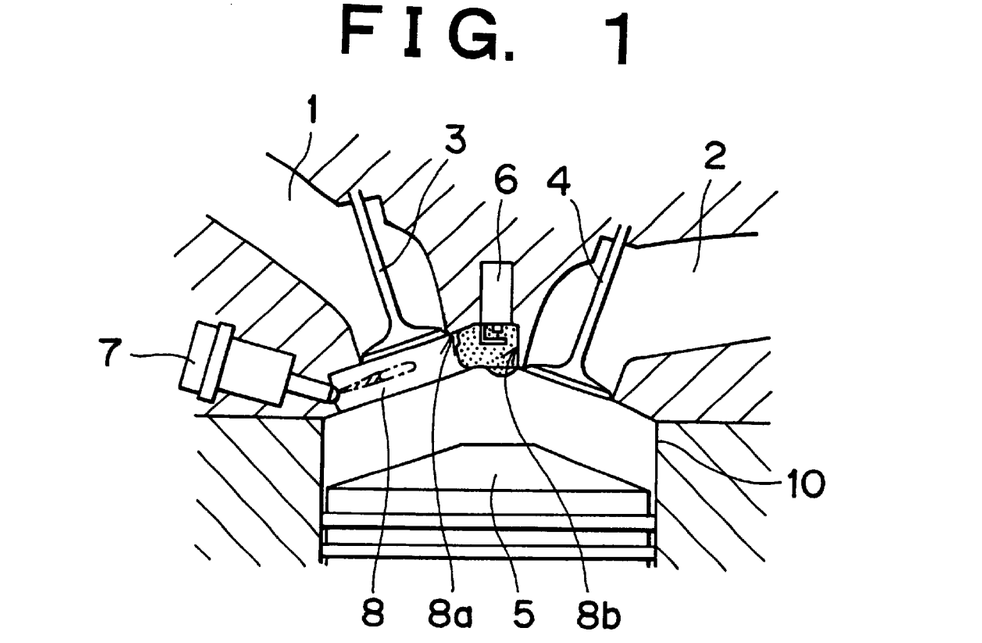
FIG. 1 is a schematic longitudinal sectional view of a cylinder, illustrating a first embodiment of the direct-fuel-injection-type spark-ignition internal combustion engine of the invention.
Figure 2:
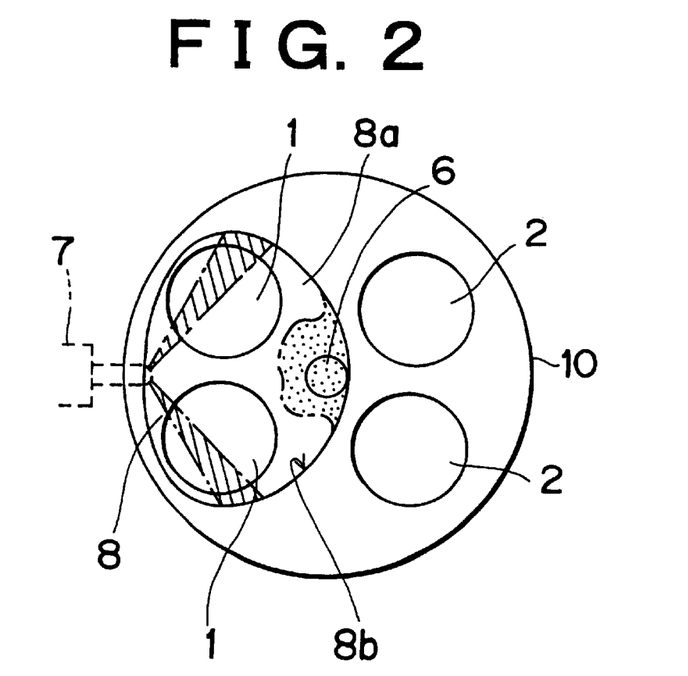
FIG. 2 is a bottom plan view of an upper portion of the cylinder of FIG. 1.

FIG. 1 is a schematic longitudinal sectional view, illustrating a first embodiment of the direct-fuel-injection-type spark-ignition internal combustion engine of the invention. FIG. 2 is a bottom plan view of an upper portion of a cylinder 10 in the first embodiment. As shown in FIGS. 1 and 2, an upper portion of the cylinder 10 of the direct-fuel-injection-type spark-ignition internal combustion engine is provided with intake ports 1 and exhaust ports 2. The intake ports 1 and the exhaust ports 2 communicate with the cylinder 10 via intake valves 3 and exhaust valves 4, respectively. A piston 5 is disposed in the cylinder 10. A cavity 8 is formed in the cylinder upper portion. The two intake ports 1 open to an upper wall 8a of the cavity 8. Furthermore, an ignition plug 6 protrudes from the upper wall 8a of the cavity 8. The ignition plug 6 is positioned substantially at a center of the upper portion of the cylinder 10. Thus, a side wall 8b of the cavity 8 extends surrounding the two intake ports 1 and the ignition plug 6. The side wall 8b extends through the vicinity of the ignition plug 6. A fuel injection valve 7 is positioned in a portion of the side wall 8b of the cavity 8 that is opposite and remote from the ignition plug 6.

The fuel injection valve 7 has a slit-like injection hole for injecting fuel in the shape of a sector having a small thickness or height. The fuel injection valve 7 in this embodiment has two slit-like injection holes for injecting fuel in two directions as indicated by hatching in FIG. 2 in such a manner that the thickness of each sector-shaped (i.e. fan-sharped) fuel spray substantially equals the height of the side wall 8b of the cavity 8. The fuel injecting directions and the shape of the side wall 8b of the cavity 8 are set so that each portion of fuel injected from the fuel injection valve 7 in the two directions strikes the side wall 8b of the cavity 8 at an acute angle with respect to a tangent to the side wall 8b at the point where the fuel strikes the side wall 8b.

A cross-sectional shape of the side wall 8b of the cavity 8 is generally symmetric about a vertical plane that includes a center axis of the fuel injection valve 7 and a center axis of the ignition plug 6. The fuel injection valve 7 injects sector-shaped fuel sprays in two directions that are generally symmetric to each other about the vertical plane.

After impacting on the side wall 8b of the cavity 8, fuel in each spray travels along the side wall 8b toward the ignition plug 6 located near the side wall 8b due to its inertia. Thus, a portion of the side wall 8b serves as a fuel guide portion for guiding fuel to the vicinity of the ignition plug 6. Due to the above-described construction in this embodiment, the distances from the two fuel impact positions on the side wall 8b to a position adjacent to the ignition plug 6 substantially equal each other. Therefore, injected liquid fuel sprays indicated by hatching in FIG. 2, after striking the side wall 8b, gradually vaporize with heat received during movement along the fuel guide portion toward the ignition plug 6, and then collide each other when reaching the vicinity of the ignition plug 6. As a result, a combustible air-fuel mixture is formed at a location indicated by a dotted area in FIG. 2. In this and other exemplary embodiments, the fuel guide portion perpendicularly intersects a center plane of the height of the fuel sprays, so that liquid fuel moving along the fuel guide portion does not flow out of the cavity but the entire amount of fuel injected forms a combustible mixture.

As shown in FIGS. 1 and 2, fuel is injected into the cavity 8 formed in an upper portion of the cylinder 10. Therefore, the fuel injection valve 7 is able to inject fuel during an early period of the compression stroke regardless of the position of the piston 5. Hence, it becomes possible to inject a relatively large amount of fuel. During such a fuel injection and, particularly, during a later period of the fuel injection, the fuel guide portion of the side wall 8b of the cavity 8 undergoes a temperature drop due to vaporization of the large amount of fuel, so that the heat transferred from the fuel guide portion to the fuel may become insufficient and liquid fuel may reach the vicinity of the ignition plug 6. However, due to collision in the vicinity of the ignition plug 6, the liquid fuel turns into fine particles, and then easily vaporizes. Therefore, even when a relatively large amount of fuel is injected, a combustible mixture can be formed in the vicinity of the ignition plug 6.

Even if a squish flow from the side of the exhaust ports 2 in the upper portion of the cylinder 10 occurs during a later period of the compression stroke, the squish flow does not affect the combustible mixture formed in the vicinity of the ignition plug 6. Thus, since there is no factor that causes the combustible mixture to move from the vicinity of the ignition plug 6, the combustible mixture resides in the vicinity of the ignition plug 6, so that ignition and combustion can be performed at any time. Therefore, it is possible to freely set the fuel injection timing and the ignition timing and to reliably position a combustible mixture in the vicinity of the ignition plug at the time of ignition regardless of engine revolution speed even if a relatively large amount of fuel is injected. Thus, a good stratified charge combustion can be realized. As a result, the operational range of stratified charge combustion that achieves a reduced specific fuel consumption can be reliably expanded toward the high-speed/high-load operation side.

During a high-load engine operation requiring large amounts of fuel, or the like, fuel is injected during the intake stroke to perform uniform combustion. Since a portion of the fuel guide portion of the side wall 8b of the cavity 8 is adjacent to the cylinder-side openings of the intake ports 1, fuel injected from the fuel injection valve 7, while traveling across the cylinder-side openings of the intake ports 1, is stirred by intake air flows from the cylinder-side openings of the intake ports 1 during the uniform combustion operation. Furthermore, fuel that has reached the fuel guide portion is well stirred by intake flows moving along the fuel guide portion. Thus, a sufficiently homogenized uniform mixture is formed in the cylinder at the time of ignition, so that a good uniform combustion can be realized.

As shown in FIGS. 1 and 2, the fuel injection valve 7 injects fuel in the two directions and the two portions of fuel are guided by the fuel guide portion of the side wall 8b of the cavity 8 so as to collide with each other in the vicinity of the ignition plug 6. However, it is also possible to inject fuel in one direction. In such a case, fuel injected during a stratified charge combustion operation forms a combustible mixture in a narrow-and-long shape moving along the side wall 8b of the cavity 8. The combustible mixture in a narrow-and-long shape achieves a relatively-long-time contact with an ignition gap of the ignition plug 6, during which ignition and combustion can be performed. Therefore, the fuel injection timing and the ignition timing can be relatively freely set. Hence, it becomes possible to realize a good stratified charge combustion by reliably positioning a combustible mixture in the vicinity of the ignition plug at the time of ignition regardless of engine revolution speed even if a relatively large amount of fuel is injected. In this case, if a relatively large amount of fuel is injected during the stratified charge combustion operation, a combustible mixture is formed in an annular shape along the side wall 8b of the cavity 8. The combustible mixture in the annular shape is always in contact with the ignition plug 6, so that ignition and combustion can be performed at any time. Thus, a good stratified charge combustion can be realized.

In the case of one-direction fuel injection, a portion of the fuel guide portion of the side wall 8b of the cavity 8 is adjacent to the cylinder-side openings of the intake ports 1, so that a good uniform combustion can be performed as described above. Furthermore, although as shown in FIGS. 1 and 2, the side wall 8b of the cavity 8 extends surrounding the ignition plug 6 and the cylinder-side openings of the two intake ports 1, the side wall 8b of the cavity 8 may surround only one intake port and an ignition plug in either a single-intake-valve construction or a dual-intake-valve construction.

Figure 3:
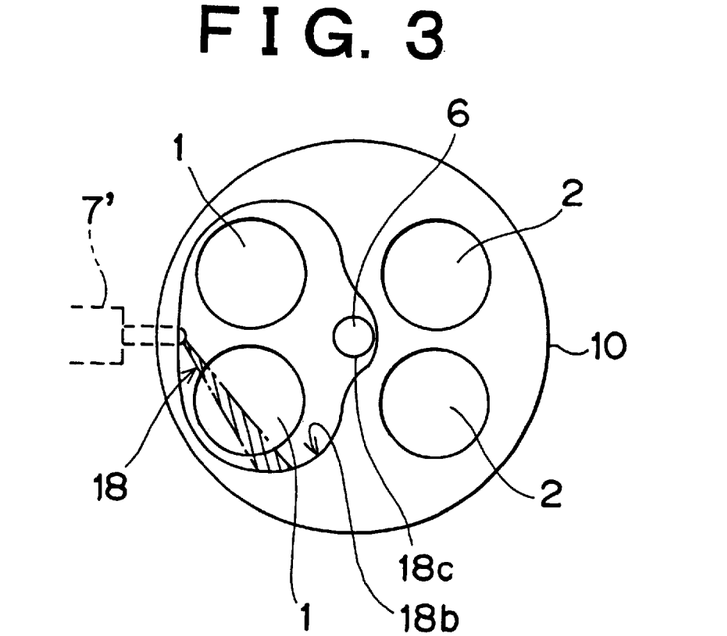
FIG. 3 is a bottom plan view of an upper portion of a cylinder, illustrating a second embodiment of the direct-fuel-injection-type spark-ignition internal combustion engine of the invention.

FIG. 3 is a bottom plan view of an upper portion of a cylinder 10, illustrating a second embodiment of the direct-fuel-injection-type spark-ignition internal combustion engine of the invention. The same reference numerals as those used for the first embodiment represent the same component elements. Differences from the first embodiment will mainly be described below. A side wall 18b of a cavity 18 extends surrounding cylinder-side openings of two intake ports 1 and an ignition plug 6 as in the first embodiment. The side wall 18b has a plug pocket portion 18c that surrounds at least a half of the periphery of the ignition plug 6.

A fuel injection valve 7' injects fuel in one direction as indicated by hatching in FIG. 3 in such a manner that the direction of the thickness of the fuel spray substantially equals the direction of the height of the side wall 18b of the cavity 18. And, the fuel injection 7' injects fuel in such manner that the thickness of the fuel spray is thinner than the height of the side wall 18b of cavity 18. The fuel injecting direction and the shape of the side wall 18b of the cavity 18 are set so that each fuel portion strikes the side wall 18b of the cavity 18 at an acute angle with respect to a tangent of the side wall 18b at the point where the fuel strikes the side wall 18b.

Figure 4:
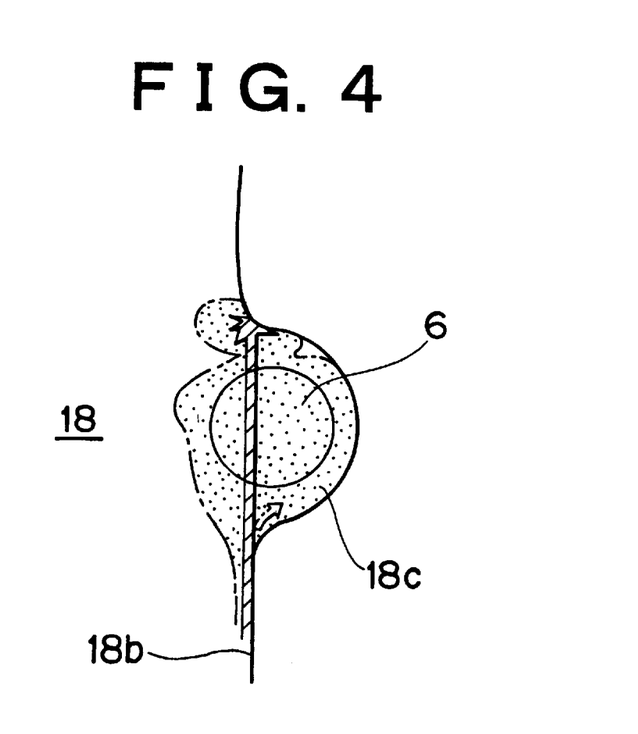
FIG. 4 is an enlarged view of a plug pocket portion in the second embodiment.

FIG. 4 is an enlarged view illustrating the shape of the plug pocket portion 18c. As shown in FIG. 4, a fuel guide portion of the side wall 18b of the cavity 18 extends from a position of impact of fuel injected from the fuel injection valve 7' on the side wall 18b to the plug pocket portion 18c. As shown in FIG. 4, a portion of the side wall 18b of the cavity 18 that extends from the plug pocket portion 18c on the side opposite from the fuel guide portion is formed so that an imaginary extended plane of the fuel guide portion intersects the wall surface of the plug pocket portion 18c.

Due to this construction, liquid fuel as indicated by hatching in FIG. 3, after striking the side wall 18b of the cavity 18, moves along the fuel guide portion and reaches the plug pocket portion 18c by its own inertia. Fuel vaporizes during movement along the fuel guide portion due to heat from the fuel guide portion, and then enters the plug pocket portion 18c as indicated by an arrow of a one-dot chain line due to the Coanda effect, and also spreads outside the opening of the plug pocket portion 18c, thus forming a combustible mixture as indicated by a dotted area in FIG. 4 in the vicinity of the ignition plug 6.

When a relatively large amount of fuel is injected, there is a possibility that liquid fuel reaches the plug pocket portion 18c as stated above. However, such liquid fuel turns into fine particles upon impact on the wall surface of the plug pocket portion 18c as indicated by hatching in FIG. 4, so that the liquid fuel easily vaporizes and forms a combustible mixture in the vicinity of the ignition plug 6 together with gaseous fuel vaporized by heat from the fuel guide portion.

The thus-formed combustible mixture resides in the vicinity of the ignition plug 6 since there is no factor that causes the mixture to move from the vicinity of the ignition plug 6, so that ignition and combustion can be performed at any time. Therefore, it is possible to freely set the fuel injection timing and the ignition timing and to reliably position a combustible mixture in the vicinity of the ignition plug at the time of ignition regardless of engine revolution speed even if a relatively large amount of fuel is injected. Thus, a good stratified charge combustion can be realized. As a result, the operational range of stratified charge combustion that achieves a reduced specific fuel consumption can be reliably expanded toward the high-speed/high-load operation side.

As shown in FIGS. 3 and 4, since a portion of the fuel guide portion of the side wall 18b of the cavity 18 is adjacent to the cylinder-side opening of an intake port 1, fuel injected from the fuel injection valve 7' during the uniform combustion operation is well stirred by intake air flows from the cylinder-side opening of the intake port 1, as mentioned above. Thus, a sufficiently homogenized uniform mixture is formed in the cylinder at the time of ignition, so that a good uniform combustion can be realized.

Figure 5:
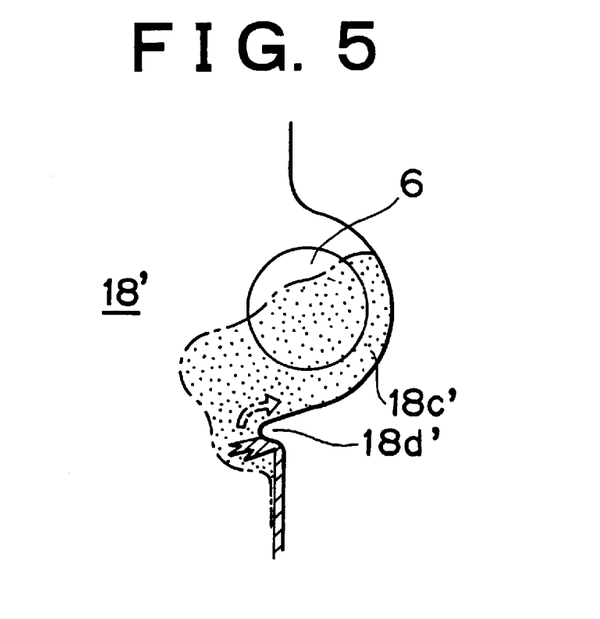
FIG. 5 is an enlarged view of a modification of the plug pocket portion shown in FIG. 4.

FIG. 5 is an enlarged view of a plug pocket portion 18c' according to a modification of the plug pocket portion of FIGS. 3 and 4. The plug pocket portion 18c' has, at a terminal end of the fuel guide portion contiguous to the plug pocket portion 18c', a barrier 18d' protruding inwardly with respect to the cavity 18'. Due to this construction, fuel vaporized during movement along the fuel guide portion is temporarily directed inwardly with respect to the cavity 18' by the barrier 18d', but is immediately caused to form a combustible mixture as indicated by a dotted area in FIG. 6 in the vicinity of the plug pocket 18c ' due to the Coanda effect.

If fuel in a liquid state reaches the plug pocket portion 18c', the liquid fuel turns into fine particles at the time of impact of the liquid fuel, and therefore readily vaporizes. The particle forming position is also in the vicinity of the ignition plug 6. Therefore, vaporized fuel from fine particles joins fuel vaporized by heat received from the fuel guide portion to form a combustible mixture in the vicinity of the ignition plug 6.

Thus, it is possible to reliably position a good combustible mixture in the vicinity of the ignition plug at the time of ignition and realize a good stratified charge combustion. Furthermore, there is no possibility of liquid fuel depositing in the ignition gap of the ignition plug 6, so that the sedimentation of deposit in the ignition gap can be reduced and the service life of the ignition plug 6 can be extended.

The barrier 18*d*' is also effective for a cavity 8 having no plug pocket as shown in FIGS. 1 and 2. If a barrier is provided in the fuel guide portion, more specifically, at a location slightly before the ignition plug 6, liquid fuel and vaporized fuel can be prevented from passing by the ignition plug 6. This is advantageous to reliably position a combustible mixture in the vicinity of the ignition plug 6 at the time of ignition. Furthermore, if a barrier is provided in the fuel guide portion, at a location slightly before the ignition plug 6, it becomes possible to prevent passage of liquid fuel and vaporized fuel by the ignition plug 6 and prevent direct impact of liquid fuel on the ignition plug 6.

Figure 6:
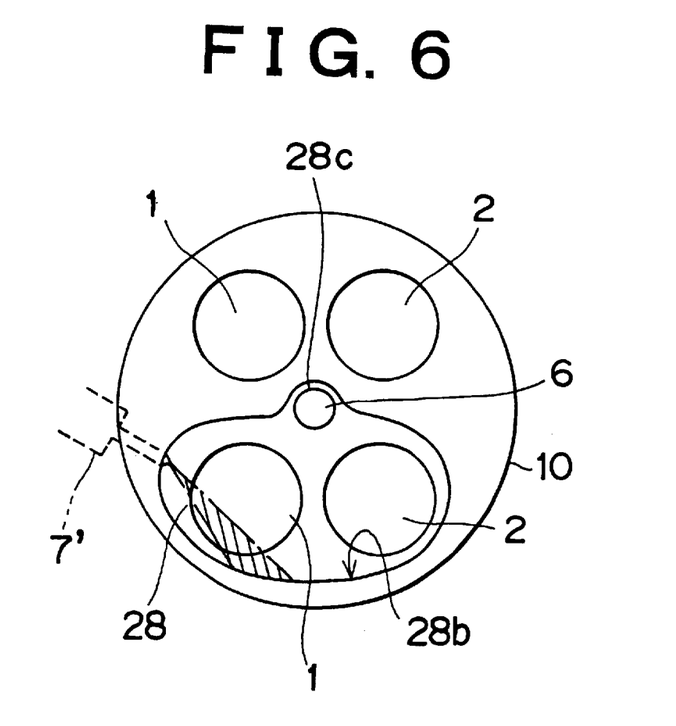
FIG. 6 is a bottom plan view of an upper portion of a cylinder, illustrating a third embodiment of the direct-fuel-injection-type spark-ignition internal combustion engine of the invention.

FIG. 6 is a bottom plan view of an upper portion of a cylinder 10, illustrating a third embodiment of the direct-fuel-injection-type spark-ignition internal combustion engine of the invention. A side wall 28*b* of a cavity 28 extends surrounding an ignition plug 6 and cylinder-side openings of an intake port 1 and an exhaust port 2 that are adjacent to each other. The side wall 28*b* has a plug pocket portion 28*c* similar to those of FIGS. 3–5. A fuel injection valve 7' injects fuel so that fuel strikes a portion of the side wall 28*b* of the cavity 28 adjacent to the intake port 1 as indicated by hatching in FIG. 6.

Due to this construction, the third embodiment achieves substantially the same advantages as those of FIGS. 3–5. Furthermore, since the fuel guide portion of the side wall 28*b* of the cavity 28 is partially located adjacent to the cylinder-side opening of the intake port 1 and adjacent to the cylinder-side opening of the exhaust port 2, the temperature of the fuel guide portion is increased, so that fuel moving along the fuel guide portion can be more favorably vaporized. Therefore, it becomes possible to further increase the amount of fuel injected during the compression stroke and therefore reliably expand the operational range of stratified charge combustion, which achieves a low specific fuel consumption, toward the high-speed/high-load operation side.

Figure 7:
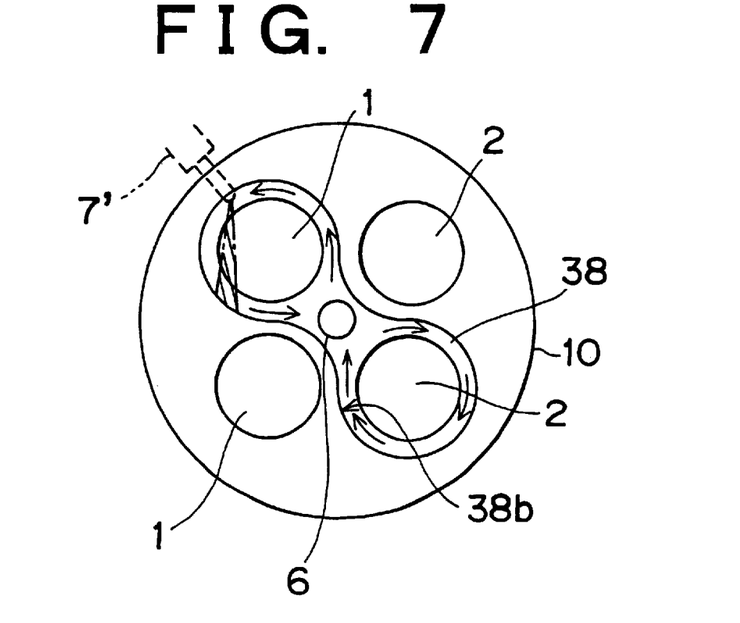
FIG. 7 is a bottom plan view of an upper portion of a cylinder, illustrating a fourth embodiment of the direct-fuel-injection-type spark-ignition internal combustion engine of the invention.

FIG. 7 is a bottom plan view of an upper portion of a cylinder 10, illustrating a fourth embodiment of the direct-fuel-injection-type spark-ignition internal combustion engine of the invention. The same reference numerals as those used for the foregoing embodiments represent the same component elements. Differences from the second embodiment will be mainly described. A side wall 38*b* of a cavity 38 extends generally in the shape of a FIG. "8" so as to surround an ignition plug 6 and cylinder-side openings of an intake port 1 and an exhaust port 2 that are opposite to each other on a diagonal line. A fuel injection valve 7' injects fuel so that fuel strikes a portion of the side wall 38*b* of the cavity 38 adjacent to the intake port 1 as indicated by hatching in FIG. 7.

Due to this construction, fuel injected from the fuel injection valve 7' moves along the side wall 38*b* of the cavity 38 taking a FIG. "8"-shaped course as indicated by arrows in FIG. 7, provided that the amount of fuel injected is large. Thus, substantially the entire side wall 38*b* forms a fuel guide portion. If during the stratified charge combustion operation, the amount of fuel injected is small and the fuel injection is started near the ignition timing, the entire amount of fuel injected turns into a combustible mixture by the time it has passed along a portion of the fuel guide portion that is adjacent to the cylinder-side opening of the intake port 1. The ignition and combustion of the combustible mixture is possible until the mixture has passed by the ignition plug 6.

If the amount of fuel injected is increased and the fuel injection start timing is advanced, injected fuel does not entirely turn into a combustible mixture by the time it has passed along a portion of the fuel guide portion adjacent to the cylinder-side opening of the intake port 1. Injected fuel turns entirely into a combustible mixture during the passage along a portion of the fuel guide portion adjacent to the cylinder-side opening of the exhaust port 2. The ignition and combustion of the combustible mixture is possible when the mixture passes by the ignition plug 6 again. In this case, a relatively long portion of the fuel guide portion is adjacent to the cylinder-side opening of the exhaust port 2, so that the temperature of the adjacent portion of the fuel guide portion becomes high and a relatively large amount of fuel can be sufficiently vaporized.

Even if the amount of fuel injected is further increased and the fuel injection start timing is further advanced, injected fuel can be reliably vaporized due to the relatively long portion of the fuel guide portion adjacent to the cylinder-side opening of the exhaust port 2. The combustible mixture thus formed over a relatively long distance passes along a portion of the fuel guide portion adjacent to the cylinder-side opening of the intake port 1, and then reaches the vicinity of the ignition plug 6 again. After that, the ignition and combustion of the mixture is possible when it passes by the ignition plug 6.

Thus, it is possible to reliably position a combustible mixture in the vicinity of the ignition plug 6 at the time of ignition and realize a good stratified charge combustion, for various amounts of fuel injected. Furthermore, during the uniform combustion operation, injected fuel is sufficiently stirred by intake flows from the cylinder-side opening of the intake port 1 since a portion of the fuel guide portion is adjacent to the cylinder-side opening of the intake port 1. Even if a portion of the fuel is not stirred by intake flows but moves ahead along the fuel guide portion at a moment, the unstirred portion of fuel also returns to the portion of the fuel guide portion adjacent to the cylinder-side opening of the intake port 1, as described above in conjunction with the stratified charge combustion operation, so that the entire amount of fuel injected will be sufficiently stirred by intake flows, thus, forming an even better uniform mixture at the time of ignition.

Figure 8:
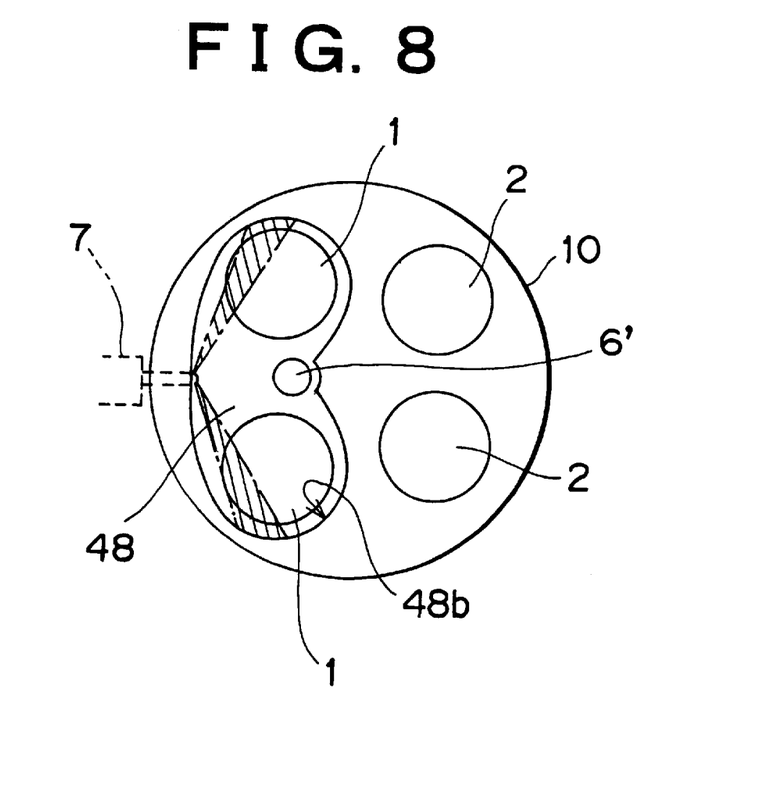
FIG. 8 is a bottom plan view of an upper portion of a cylinder, illustrating a fifth embodiment of the direct-fuel-injection-type spark-ignition internal combustion engine of the invention.

FIG. 8 is a bottom plan view of an upper portion of a cylinder 10, illustrating a fifth embodiment of the direct-fuel-injection-type spark-ignition internal combustion engine of the invention. The same reference numerals as those used for the foregoing embodiments represent the same component elements. Differences from the first embodiment will be mainly described. A side wall 48*b* of a cavity 48 extends so as to surround the cylinder-side openings of two intake ports 1 and an ignition plug 6'. However, the ignition plug 6' is offset from the center of the cylinder 10 to the side of the intake ports 1, so that relatively long portions of a fuel guide portion of the side wall 48*b* are adjacent to the cylinder-side openings of the two intake ports 1.

Due to this construction, the fifth embodiment achieves substantially the same advantages as those of FIGS. 1 and 2.

Furthermore, the fifth embodiment allows good contact between injected fuel and intake flows and therefore achieves even more sufficient stirring during the uniform combustion operation, so that an even better uniform mixture can be formed in the cylinder 10 at the time of ignition.

Figure 9:
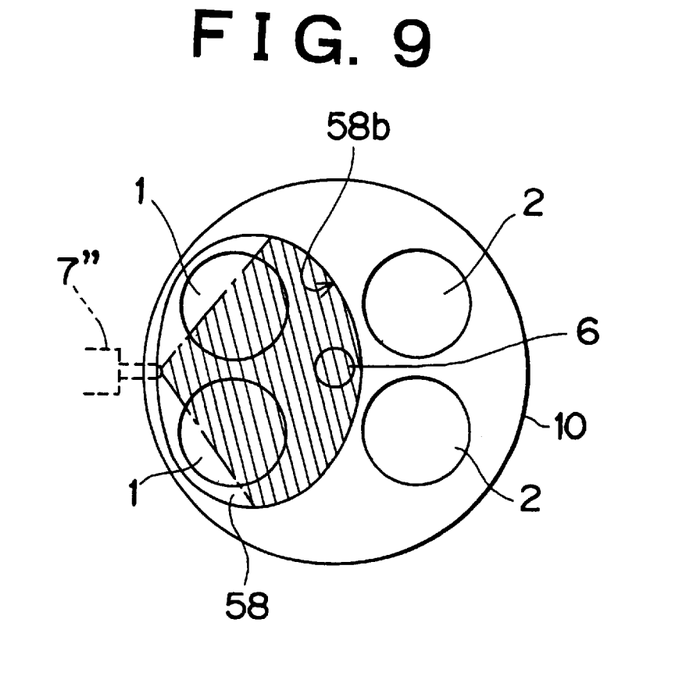
FIG. 9 is a bottom plan view of an upper portion of a cylinder, illustrating a sixth embodiment of the direct-fuel-injection-type spark-ignition internal combustion engine of the invention.

FIG. 9 is a bottom plan view of an upper portion of a cylinder 10, illustrating a sixth embodiment of the direct-fuel-injection-type spark-ignition internal combustion engine of the invention. The same reference numerals as those used for the foregoing embodiments represent the same component elements. Differences from the first embodiment will be mainly described. As shown in FIG. 9, the shape of a cavity 58 is generally symmetric about a vertical plane that includes a center axis of a fuel injection valve 7" and a center axis of an ignition plug 6. A side wall 58b of the cavity 58 extends so as to surround the ignition plug 6 and the cylinder-side openings of two intake ports 1. The fuel injection valve 7" injects fuel in one direction in the shape of a sector having a small thickness so that a central portion of the sector-shaped fuel spray is directed toward the center axis of the ignition plug 6. Preferably, the height of the ignition plug 6 is set so that injected fuel does not directly strike the ignition gap of the ignition plug 6.

Thus, injected fuel strikes various portions of the side wall 58b of the cavity 58. The shape of a portion of the side wall 58b within a fuel-striking range is set so that injected fuel strikes each impact portion of the side wall 58b at an acute angle with respect to a tangent to the side wall 58b at the point where the fuel strikes the side wall 58b. In this construction, the portion of the side wall 58b within the fuel-striking range forms a fuel guide portion. Each fuel portion, after striking the side wall 58b, is guided along the fuel guide portion of the side wall 58b toward the ignition plug 6 due to its own inertia.

Due to the symmetric shape of the side wall 58b, two fuel portions that strike the side wall 58b at equal distances from the ignition plug 6 have substantially equal amounts of inertia toward the ignition plug 6, so that the two fuel portions simultaneously reach the vicinity of the ignition plug 6 and then collide with each other to form a combustible mixture in the vicinity of the ignition plug 6. The combustible mixture always remains in contact with the ignition plug 6, so that it can always be ignited and combusted. Furthermore, it is possible to reliably position a combustible mixture in the vicinity of the ignition plug 6 at the time of ignition, so that a good stratified charge combustion can be realized.

Furthermore, the side wall 58b of the cavity 58 is formed so that fuel impacts on the side wall 58b at a greater acute angle if the fuel impact position is closer to the ignition plug 6. Therefore, as the distance of the impact position of a fuel portion from the ignition plug 6 increases, the inertia of the fuel portion toward the ignition plug 6 increases. Hence, fuel portions that are simultaneously injected reach the vicinity of the ignition plug 6 substantially simultaneously, and then collide with each other to form a combustible mixture in the vicinity of the ignition plug 6. Consequently, even if the amount of fuel injected is particularly small, it is possible to reliably position a body of combustible mixture in the vicinity of the ignition plug 6 at the time of ignition and therefore accomplish a good stratified charge combustion.

Furthermore, a fuel spray injected from the fuel injection valve 7" into the cavity 58 travels across greater areas of the openings of the intake ports 1 than in the foregoing embodiments. Therefore, during the uniform combustion operation, injected fuel can be reliably stirred by intake flows with an increased sufficiency, so that an even better uniform mixture can be formed at the time of ignition.

Figure 10:
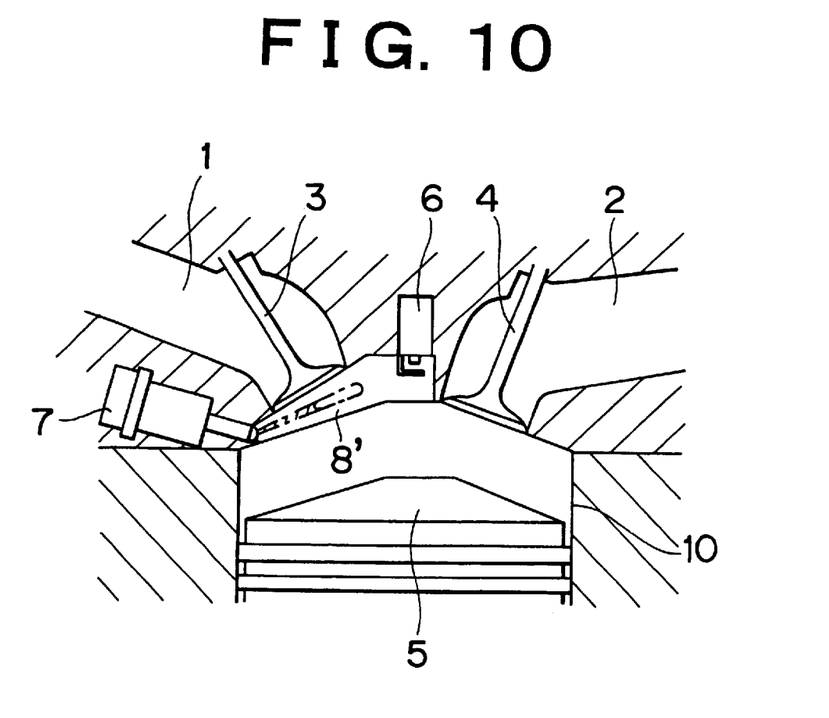
FIG. 10 is a schematic longitudinal sectional view of a cylinder, illustrating a seventh embodiment of the direct-fuel-injection-type spark-ignition internal combustion engine of the invention.

FIG. 10 is a schematic longitudinal sectional view, illustrating a seventh embodiment of the direct-fuel-injection-type spark-ignition internal combustion engine of the invention. The same reference numerals as those used for the foregoing embodiments represent the same component elements. Differences from the first embodiment will be mainly described. A cavity 8' is formed so that a side wall of the cavity 8' on the side of a fuel injection valve 7 and a side wall on the side of a fuel guide portion have lower heights than a side wall on the side of an ignition plug 6.

Fuel injected from a slit-like pore of the fuel injection valve 7 forms a sector-shaped fuel spray having a small thickness. The thickness of the fuel spray gradually increases with increases in the travel distance of the spray and with increases in the moving distance thereof after the impact on the side wall. Therefore, in order to prevent fuel from flowing out of the cavity 8', the height of the side wall near the ignition plug 6 must be relatively large.

If the side wall adjacent to the fuel injection valve 7 is about as high as the side wall near the ignition plug 6 as in FIGS. 1 and 2, the area of the inner surfaces of the cavity increases and, therefore, the area in the cavity that receives heat during combustion increases, so that heat loss increases. As shown in FIG. 10, however, the heat-receiving area in the cavity 8' is decreased, so that heat loss is reduced. It should also be appreciated that the heat-receiving areas of the cavities shown in FIGS. 1–10 may also be decreased, so that heat loss is reduced.

As described above, the shape of the cavity is set so that at least a portion of the fuel guide portion is adjacent to the cylinder-side opening of an intake port, in order to achieve a good uniform combustion based on fuel injection performed during the intake stroke. However, if only the stratified charge combustion is concerned, the side wall of the cavity may extend around only the ignition plug and the cylinder-side opening of an exhaust port.

In all the foregoing embodiments, the fuel injection valve injects fuel in the shape of a sector having a small thickness. However, fuel may also be injected in the shape of a cone or a cylinder, for example. However, whatever shape of the fuel spray is selected, it is essential to select or adjust a shape of the fuel spray so that the whole or most of the injected fuel will be prevented from flowing out of the cavity, taking into consideration the expansion of the fuel spray in the direction of height in accordance with the travel distance of the fuel spray and the moving distance thereof after the impact on the cavity side wall, as mentioned above in conjunction with FIG. 10. Therefore, a fuel injection valve that has a plurality of small injection holes to inject fuel in the form of a plurality of narrow cylinders is particularly useful, compared with the fuel injection valves employed FIGS. 1–10.

Furthermore, although as shown in FIGS. 1–10, the fuel injection valve is disposed in the cavity side wall, the disposal of the fuel injection is not particularly limited, as long as the fuel injecting direction and the cavity shape are set so that most of the fuel injected is prevented from flowing out of the cavity, as stated above. For example, the fuel injection valve may be disposed outside the cavity.

While the invention has been described with reference to the exemplary embodiments described above, it is to be understood that the invention is not limited to the disclosed embodiments or constructions. On the contrary, the invention is intended to cover various modifications and equivalent arrangements.

What is claimed is:

1. A direct-fuel-injection-type spark-ignition internal combustion engine comprising:

a cylinder in which a fuel is combusted;

an ignition plug that ignites the fuel in the cylinder;

a cavity that is formed in an upper wall of the cylinder and that has a side wall surrounding the ignition plug;

a fuel injection valve that injects the fuel so that a main portion of the fuel strikes the side wall of the cavity at an acute angle with respect to a tangent to the side wall at the point where the fuel strikes the side wall; and a fuel guide portion that is provided in the side wall of the cavity and that guides the fuel that has struck the side wall to a vicinity of the ignition plug.

2. A direct-fuel-injection-type spark-ignition internal combustion engine according to claim 1, wherein the fuel injection valve injects the main portion of the fuel separately in at least two directions, and portions of the main portion of the fuel injected in the two directions are guided along the fuel guide portion to the vicinity of the ignition plug so as to face each other.

3. A direct-fuel-injection-type spark-ignition internal combustion engine according to claim 1, wherein at least a portion of the fuel guide portion is adjacent to an intake port opening formed in the upper wall of the cylinder.

4. A direct-fuel-injection-type spark-ignition internal combustion engine according to claim 1, wherein at least a portion of the fuel guide portion is adjacent to an exhaust port opening formed in the upper wall of the cylinder.

5. A direct-fuel-injection-type spark-ignition internal combustion engine according to claim 1, further comprising a barrier portion provided in the fuel guide portion so that a liquid fuel moving along the fuel guide portion strikes the barrier portion in the vicinity of the ignition plug.

6. A direct-fuel-injection-type spark-ignition internal combustion engine according to claim 1, wherein the fuel injection valve injects the fuel as a generally flat sector-shaped fuel spray having a small thickness so that a central portion of the sector-shaped fuel spray in a direction of a width of the sector-shaped fuel spray is directed substantially toward a center axis of the ignition plug.

7. A direct-fuel-injection-type spark-ignition internal combustion engine according to claim 1, further comprising a pocket portion that is provided in the side wall of the cavity and that has a wall surface surrounding a portion of a periphery of the ignition plug and opens inwardly with respect to the cavity, the wall surface of the pocket portion extending from the fuel guide portion.

8. A direct-fuel-injection-type spark-ignition internal combustion engine according to claim 7, wherein a portion of the side wall of the cavity extending further from the fuel guide portion is formed so that an imaginary surface extending from the fuel guide portion intersects the wall surface of the pocket portion.

9. A direct-fuel-injection-type spark-ignition internal combustion engine according to claim 1, wherein the side wall of the cavity is formed so that a portion of the side wall on a side of the ignition plug is higher than a portion of the side wall on a side of the fuel injection valve.

10. A direct-fuel-injection-type spark-ignition internal combustion engine according to claim 1, wherein the side wall of the cavity extends around at least one of an intake port opening and an exhaust port opening that are formed in the upper wall of the cylinder.

11. A direct-fuel-injection-type spark-ignition internal combustion engine according to claim 10, wherein the fuel injection valve injects the fuel so that the fuel moves across at least one of the intake port opening and the exhaust port opening around which the side wall of the cavity extends.

12. A method of injecting fuel in a direct-fuel-injection-type spark-ignition internal combustion engine having a cylinder in which a fuel is combusted; an ignition plug that ignites the fuel in the cylinder; and a cavity that is formed in an upper wall of the cylinder and that has a side wall surrounding the ignition plug; the method comprising:

injecting fuel with a fuel injection valve so that a main portion of the fuel strikes the side wall of the cavity at an acute angle with respect to a tangent to the side wall at the point where the fuel strikes the wide wall; and guiding the fuel that has struck the side wall to a vicinity of the ignition plug with a fuel guide portion that is provided in the side wall of the cavity.

13. A method according to claim 12, wherein the fuel injection valve injects the main portion of the fuel separately in at least two directions, and portions of the main portion of the fuel injected in the two directions are guided along the fuel guide portion to the vicinity of the ignition plug so as to face each other.

14. A method according to claim 12, wherein at least a portion of the fuel guide portion is adjacent to an intake port opening formed in the upper wall of the cylinder.

15. A method according to claim 12, wherein at least a portion of the fuel guide portion is adjacent to an exhaust port opening formed in the upper wall of the cylinder.

16. A method according to claim 12, further comprising providing a barrier portion in the fuel guide portion so that a liquid fuel moving along the fuel guide portion strikes the barrier portion in the vicinity of the ignition plug.

17. A method according to claim 12, wherein the fuel injection valve injects the fuel as a generally flat sector-shaped fuel spray having a small thickness so that a central portion of the sector-shaped fuel spray in a direction of a width of the sector-shaped fuel spray is directed substantially toward a center axis of the ignition plug.

18. A method according to claim 12, further comprising providing a pocket portion in the side wall of the cavity and that has a wall surface surrounding a portion of a periphery of the ignition plug and opens inwardly with respect to the cavity, the wall surface of the pocket portion extending from the fuel guide portion.

19. A method according to claim 18, wherein a portion of the side wall of the cavity extending further from the fuel guide portion is formed so that an imaginary surface extending from the fuel guide portion intersects the wall surface of the pocket portion.

20. A method according to claim 12, wherein the side wall of the cavity is formed so that a portion of the side wall on a side of the ignition plug is higher than a portion of the side wall on a side of the fuel injection valve.

21. A method according to claim 12, wherein the side wall of the cavity extends around at least one of an intake port opening and an exhaust port opening that are formed in the upper wall of the cylinder.

22. A method according to claim 21, wherein the fuel injection valve injects the fuel so that the fuel moves across at least one of the intake port opening and the exhaust port opening around which the side wall of the cavity extends.

* * * * *